United States Patent Office 2,773,871
Patented Dec. 11, 1956

2,773,871

DYESTUFFS OF THE ANTHRAQUINONE SERIES

Jakob Brassel, Basel, Alfred Fasciati, Bottmingen, and Arthur Buehler, Rheinfelden, Switzerland, assignors to Ciba Limited, Basel, Switzerland, a Swiss firm No Drawing. Application August 13, 1954,
Serial No. 449,782

Claims priority, application Switzerland August 20, 1953

9 Claims. (Cl. 260—249)

This invention provides new dyestuffs which, like the product of the formula (1)
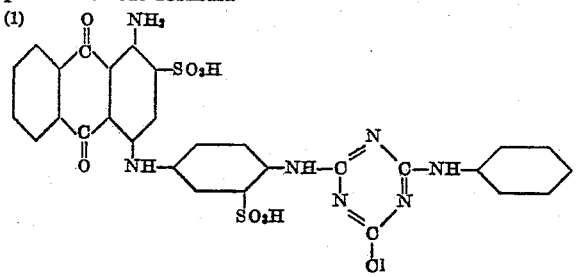

correspond to the general formula (2)          R—X—B in which R represents the radical of an anthraquinone dyestuff, X represents a nitrogen bridge and B represents the radical of a heterocyclic compound having no dyestuff character, and which contains a single reactive halogen atom and no aromatically bound free amino or hydroxyl groups, and in which dyestuffs one of the radicals B and R, advantageously R, contains a sulfonic acid group.

This invention also includes a process for making the above dyestuffs, wherein an anthraquinone dyestuff which contains an amino group containing at least one reactive hydrogen atom and advantageously also contains a sulfonic acid group, is condensed with a heterocyclic dihalogen-compound containing a reactive halogen atom and which may contain as single ionogenic substituent a sulfonic acid group but no aromatically bound free amino or hydroxyl groups and has no dyestuff character, in such manner that the resulting dyestuff condensation product contains a single reactive halogen atom and advantageously a single sulfonic acid group.

As anthraquinone dyestuffs of the aforesaid kind there come into consideration as starting materials for the present process more especially those which contain a reactive —NH₂ group in an external nucleus, that is to say, in a nucleus which is bound to the anthraquinone nucleus through an oxygen atom or advantageously through a —NH— group, such, for example, as amino-benzoylamino-anthraquinones or aminophenylamino-anthraquinones. Among these anthraquinone dyestuffs there are included above all dyestuffs which contain an unchanged anthraquinone ring of the formula (3)
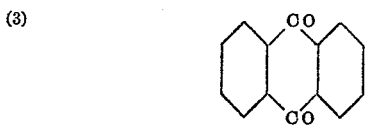

As examples of such anthraquinone dyestuffs, which can be used as starting materials for the present process, there may be mentioned: 1-(4'-aminobenzoylamino)-anthraquinone, 1-β-hydroxyethylamino-4-(4'- or 3'-amino-phenylamino)-anthraquinone, 1-methylamino-4-(4'-amino-phenylamino)-anthraquinone, and advantageously anthraquinone dyestuffs containing sulfonic acid groups, such as 1-amino-4-(4'-aminophenylamino)-anthraquinone-2:3'-disulfonic acid, and especially those containing a single sulfonic acid group such as 1-amino-4-(4'-amino-phenylamino)-anthraquinone-3'-sulfonic acid, 1-amino-4-(3'-aminophenylamino)-anthraquinone-4'-sulfonic acid, 1-amino-4-(4'- or 3'-aminophenylamino)-anthraquinone-2-sulfonic acid, 1-amino-4-(3'-amino-4'- or 6'-methylphenyl-amino)-anthraquinone-2-sulfonic acid, 1-amino-4-(4'-amino-3'-methylphenylamino)-anthraquinone-2-sulfonic acid, 1-amino-4-(3'-amino-4':6'-dimethylphenylamino)-anthraquinone-2-sulfonic acid, 1-amino-4-(4'-aminophenylami-no)-anthraquinone-3'-sulfonic acid diethylamide-2-sulfonic acid and 1-amino-4-(4'-aminophenylamino)-anthraquinone-3'-methylsulfone-2-sulfonic acid.

As heterocyclic dihalogen-compounds of the kind referred to above there may be mentioned, for example: 2:4-dichloroquinoline, N-methyl-2:4-dichloropyrimidine, 4:4'-dichloro-6:6'-diphenyl-1:1':3:3'-bis-diazine, 1:4-dichlorophthalazine, 2:4-dichloroquinazoline, 2:4-dichloro-pyrimidine and especially dihalogen-triazines of the formula (4)
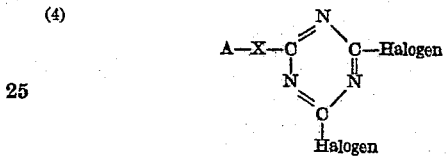

in which A represents a hydrogen atom or a radical containing advantageously not more than 12 carbon atoms and which may contain as single ionogenic substituent a sulfonic acid group but no aromatically bound hydroxyl and amino groups and has no dyestuff character, and X represents an —S—, —O— or —NH— bridge.

The dihalogen-triazines of this constitution can be made by methods in themselves known from cyanuric halides such as cyanuric bromide or cyanuric chloride, for example, by reacting 1 molecular proportion of cyanuric chloride with 1 molecular proportion of an amino-, mercapto- or hydroxy-compound having no dyestuff character, which is devoid of further aromatically bound free amino and hydroxyl groups. As such compounds there come into consideration, ammonia, aliphatic or aromatic hydroxyl compounds and mercaptans such as methyl alcohol, ethyl alcohol or butyl alcohol, phenol, ortho-, meta- or para-cresol, 4-secondary butyl-phenol, 4-tertiary amyl-phenol, dialkyl-phenols, para-chlorophenol, β-hydroxy-ethylmercaptan, dodecylmercaptan, thiophenol and especially organic nitrogen compounds such as methylamine, dimethylamine, ethylamine, diethylamine, isopropylamine, butylamine, hexylamine, phenylamine, tolylamine, 4-chlorophenylamine, N-methyl-phenylamine or cyclohexyl-amine, and also β-chloroethylamine, methoxyethylamine, ethanolamines, acetamide, butyric acid amide, urea, thiourea, toluene sulfonic acid amide, glycocoll, amino-carbonic acid esters such as the methyl or ethyl ester, ethylamino acetate, aminoacetamide, 1-aminobenzene-2- or -4-methyl sulfone, 1-aminobenzene-2-, -3- or -4-sulfonic acid or their sulfonamides or sulfones. The primary condensation products so obtained still contain two reactive halogen atoms. Those which contain no sulfonic acid groups are to be condensed only with anthraquinone dyestuffs of the kind described above which contain sulfonic acid groups.

The condensation of the aforesaid heterocyclic dihalogen-compounds with the anthraquinone dyestuffs is advantageously carried out in the presence of an acid-binding agent, such as sodium acetate or sodium carbonate, and under conditions such that the final product still contains an exchangeable halogen atom, that is to say, for example, in an organic solvent or at a relatively low temperature in an aqueous medium.

The especially valuable dyestuffs of the Formula 2 which contain a triazine residue, can also be made by a modification of the process described above. This modified process consists in condensing an anthraquinone dyestuff which contains an —$NH_2$— group and advantageously also a sulfonic acid group with a cyanuric halide, especially cyanuric chloride, in the molecular ratio of 1:1 and, in the resulting condensation product which contains two exchangeable halogen atoms reacting a further halogen atom with a hydroxy-, mercapto- or amino-compound having no dyestuff character, and which is free from further aromatically bound hydroxyl and amino groups.

As hydroxy-, mercapto- or amino-compounds having no dyestuff character, and which are free from further aromatically bound hydroxyl and amino groups, there come into consideration those which are mentioned above for making the dihalogen-triazines. As anthraquinone dyestuffs there likewise come into consideration those mentioned above, and the preparation and working up of the dyestuff condensation products is also carried out in such manner that the isolated product contains a reactive halogen atom, that is to say, in an aqueous medium at as low a temperature as possible, and in the presence of an acid-binding agent or if desired in an organic solvent.

The new products of this invention are valuable dyestuffs which are suitable for dyeing or printing a very wide variety of materials, especially nitrogenous textile materials such as silk, leather and above all wool, and also synthetic fibers of superpolyamides or superpolyurethanes. In addition to being suitable for normal acid dyeing, for example, from baths containing sulfuric acid, they are also especially suitable for dyeing from weakly alkaline, neutral or weakly acid baths, advantageously from baths having a pH value between 5 and 7. The dyeings and prints so produced are distinguished by the special purity of their tints, by a good fastness to light and by an excellent fastness to washing and fulling, especially in the alkaline region.

The following examples illustrate the invention, the parts and percentages being by weight unless otherwise stated and the relationship of parts by weight to parts by volume being the same as that of the kilogram to the liter:

*Example 1*

24.1 parts of the primary condensation product from 1 mol of cyanuric chloride and 1 mol of aniline are suspended in 50 parts of acetone and 300 parts of water, and then 51.1 parts of the monosodium salt of 1-amino-4-(4'-aminophenylamino)-anthraquinone-2:3' - disulfonic acid are added. After the addition of 50 parts by volume of a 4-molar solution of sodium acetate, the mixture is heated under reflux, while stirring, at 45–50° C., the precipitated dyestuff is filtered off and washed with sodium chloride solution of 1 percent strength. The filter cake so obtained is dried in vacuo at about 50° C. The resulting dyestuff after being ground is a dark blue powder. It dissolves in water with a blue coloration and dyes wool from weakly acid baths blue tints which are fast to washing and fulling.

*Example 2*

43.1 parts of the sodium salt of 1-amino-4-(4'-aminophenylamino)-anthraquinone-2-sulfonic acid are suspended or dissolved in about 1000 parts of water, and 18 parts of the primary condensation product from 1 mol of cyanuric chloride and 1 mol of ammonia are added. The whole is stirred for a long time at about 30–35° C., and the acid which is liberated is neutralized by the gradual addition of 5 parts of sodium carbonate. The dyestuff formed is completely precipitated by the addition of sodium chloride. The dyestuff is filtered off and washed with a dilute solution of sodium chloride and dried in vacuo. The isolated dyestuff is a blue powder which dissolves in water with a blue coloration, and dyes wool and fibers of superpolyamides from weakly acid baths greenish blue tints which are fast to washing.

By using instead of 18 parts of the primary condensation product from 1 mol of cyanuric chloride and 1 mol of ammonia, a solution of 24.1 parts of the primary condensation product from 1 mol of cyanuric chloride and 1 mol of aniline in 100 parts of tetrahydrofurane, there is obtained a dyestuff which is somewhat more sparingly soluble in water, and which dyes wool from weakly acid or neutral baths greenish blue tints of good fastness to washing or fulling.

By using instead of the anthraquinone dyestuff mentioned above, those given in column I of the following table, and, instead of the aforesaid condensation product, the primary condensation products given in column II, there are obtained dyestuffs which dye wool the tints given in column III:

| | I<br>Anthraquinone dyestuff | II<br>Primary condensation product from 1 mol of cyanuric chloride and 1 mol of— | III<br>Dyeing on wool |
|---|---|---|---|
| 1 | [anthraquinone structure with $NH_2$, $SO_3H$, NH–phenyl–$NH_2$] | aniline | reddish blue. |
| 2 | [anthraquinone structure with $NH_2$, $SO_3H$, NH–phenyl–$NH_2$] | phenol | Do. |
| 3 | [anthraquinone structure with NH–$CH_2CH_2OH$, NH–phenyl–$NH_2$] | 1-aminobenzene-3-sulfonic acid | green-blue. |

| | I<br>Anthraquinone dyestuff | II<br>Primary condensation product from 1 mol of cyanuric chloride and 1 mol of— | III<br>Dyeing on wool |
|---|---|---|---|
| 4 | Anthraquinone with NH₂, SO₃H, and NH–C₆H₄–NH₂ substituents | methylamine | blue. |
| 5 | Anthraquinone with NH₂, SO₃H, and NH–C₆H₄–NH₂ substituents | chloracetamide | greenish blue. |
| 6 | Anthraquinone with NH₂, SO₃H, and NH–C₆H₄–NH₂ substituents | cyclohexylamine | blue. |
| 7 | Anthraquinone with NH₂, SO₃H, and NH–C₆H₄–NH₂ substituents | o-chloraniline | Do. |
| 8 | Anthraquinone with NH₂, SO₃H, and NH–C₆H₄–NH₂ substituents | m-chloraniline | Do. |
| 9 | Anthraquinone with NH₂, SO₃H, and NH–C₆H₄–NH₂ substituents | p-chloraniline | Do. |
| 10 | Anthraquinone with NH₂, SO₃H, and NH–C₆H₄–NH₂ substituents | o-methylaniline | Do. |
| 11 | Anthraquinone with NH₂, SO₃H, and NH–C₆H₄–NH₂ substituents | o-methoxyaniline | Do. |

| | I<br>Anthraquinone dyestuff | II<br>Primary condensation product from 1 mol of cyanuric chloride and 1 mol of— | III<br>Dyeing on wool |
|---|---|---|---|
| 12 | [anthraquinone with NH₂, SO₃H, NH–C₆H₄–NH₂ substituents] | 2-methyl-6-chloraniline | blue. |
| 13 | [same anthraquinone structure] | 1-aminobenzene-4-methyl sulfone. | Do. |
| 14 | [same anthraquinone structure] | benzylamine | Do. |
| 15 | [same anthraquinone structure] | benzene sulfonic acid amide | Do. |
| 16 | [same anthraquinone structure] | α-furylmethylamine | Do. |
| 17 | [same anthraquinone structure] | morpholine | Do. |
| 18 | [same anthraquinone structure] | dimethylamine | Do. |
| 19 | [same anthraquinone structure] | N-methylaniline | Do. |

| | I<br>Anthraquinone dyestuff | II<br>Primary condensation product from 1 mol of cyanuric chloride and 1 mol of— | III<br>Dyeing on wool |
|---|---|---|---|
| 20 | 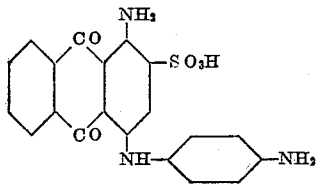 | n-dodecyl mercaptan | blue. |
| 21 | 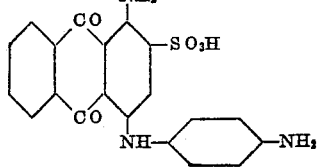 | β-hydroxyethyl mercaptan | Do. |
| 22 | 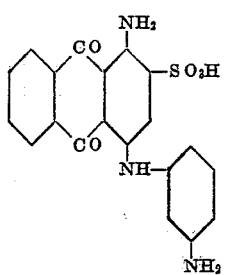 | phenol | reddish blue. |
| 23 | 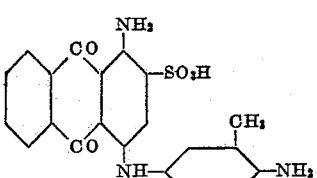 | aniline | blue. |
| 24 | 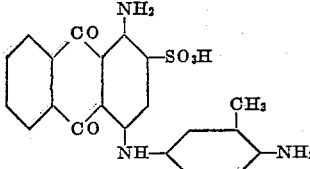 | n-dodecyl mercaptan | Do. |
| 25 | 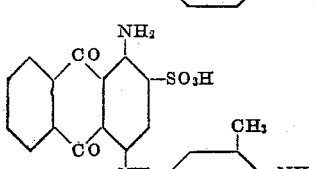 | β-hydroxyethyl mercaptan | Do. |
| 26 | 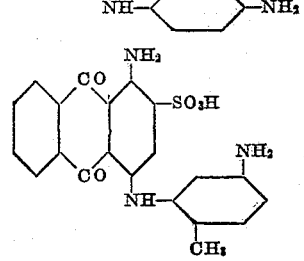 | aniline | reddish blue. |
| 27 | 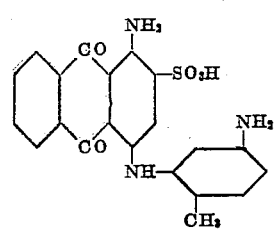 | phenol | Do. |

Example 3

43.1 parts of the sodium salt of 1-amino-4-(4'-aminophenylamino)-anthraquinone-2-sulfonic acid are dissolved in about 1000 parts of water with the addition of 4.4 parts of caustic soda and 7 parts of sodium carbonate, and 14.9 parts of 2:4-dichloropyrimidine are added. The mixture is stirred at about 35–50° C. until the condensation is finished, and the dyestuff formed is precipitated by the addition of sodium chloride. After filtering off and washing the dyestuff with dilute sodium chloride solution, it is dried in vacuo. The dyestuff isolated in this manner is a blue powder which dissolves in water and dyes wool and superpolyamide fibers from weakly acid baths full greenish blue tints.

By using, instead of the aforesaid anthraquinone derivative, 5.4 parts of the 1-amino-4-(4'-aminophenylamino)-anthraquinone-3'-sulfonic acid diethylamide-2-sulfonic acid of the formula

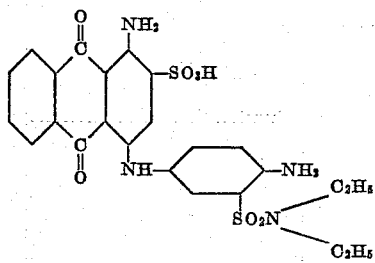

and otherwise proceeding in the same manner, there is obtained a very similar dyestuff, which dyes wool from weakly acid or neutral baths also greenish blue tints.

Example 4

43.1 parts of the sodium salt of 1-amino-4-(4'-aminophenylamino)-anthraquinone-2-sulfonic acid are dissolved in about 1000 parts of water with the addition of 4.4 parts of caustic soda and 7 parts of sodium carbonate, and 19.9 parts of 2:4-dichloroquinazoline are added. The whole is stirred for a long time at about 35–40° C. until the condensation is finished, and the dystesuff formed is precipitated by the addition of sodium chloride. After filtering off the dyestuff and washing it with a dilute solution of sodium chloride, it is dried in vacuo. The dyestuff so isolated is a blue powder which dissolves in water and dyes wool and superpolyamide fibers from weakly acid baths full greenish blue tints.

A blue dyestuff is obtained by using 1-amino-4-(4'-amino - 3' - methylphenylamino) - anthraquinone - 2- sulfonic acid, instead of the anthraquinone derivative described above.

Example 5

2 parts of the dyestuff obtained as described in Example 1 are dissolved in 4000 parts of water, 10 parts of crystalline sodium sulfate are added to the resulting dyebath, and 100 parts of wool are entered at 40–50° C. 2 parts of acetic acid of 40 percent strength are then added, the bath is raised to the boil in the course of ½ hour, and dyeing is carried on for ¾ hour at that temperature. After rinsing and drying the material, there is obtained a greenish blue dyeing which is fast to light, and has a very good fastness to washing and fulling.

The same result is obtained by using, instead of wool, superpolyamide fibers or when no acetic acid is added to the dyebath.

What is claimed is:

1. An anthraquinone dyestuff of the formula

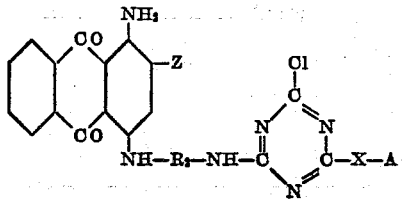

in which $R_2$ represents a benzene radical, Z represents a member of the group consisting of a sulfonic acid group and a hydrogen atom, A represents a member of the group consisting of benzene cyclohexyl and alkyl radicals of at most 12 carbon atoms and X represents a member of the group consisting of, an oxygen atom and an —NH— group, one of the radicals $R_2$ and A containing as sole water-solubilizing substituent a sulfonic acid group when Z represents a hydrogen atom.

2. An anthraquinone dyestuff of the formula

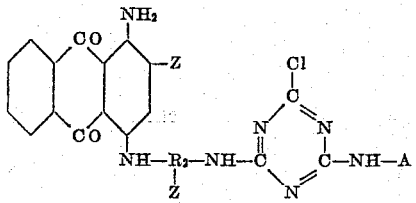

in which $R_2$ represents a benzene radical, one of the two Z's represents a sulfonic acid group and the other a hydrogen atom and A represents a hydrocarbon radical of at most 12 carbon atoms.

3. An anthraquinone dyestuff of the formula

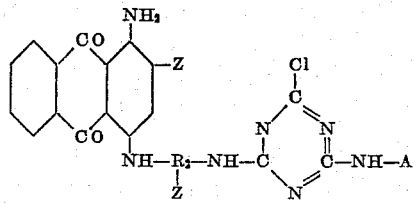

in which $R_2$ represents a benzene radical, one of the two Z's represents a sulfonic acid group and the other a hydrogen atom and A represents a benzene radical free from water-solubilizing substituents.

4. An anthraquinone dyestuff of the formula

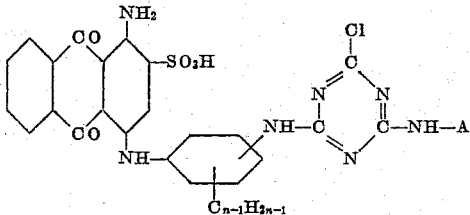

wherein $n$ represents a whole number up to 2 and A represents a six-membered carbocyclic ring free from water-solubilizing substituents.

5. The anthraquinone dyestuff of the formula

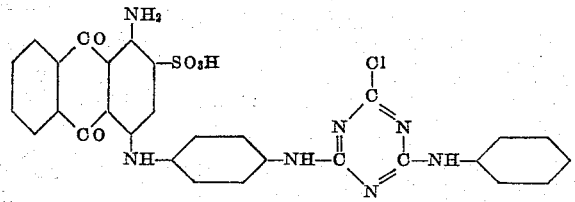

6. The anthraquinone dyestuff of the formula

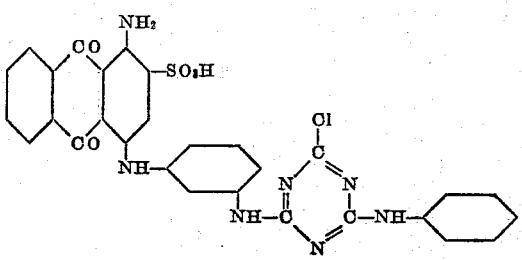

7. The anthraquinone dyestuff of the formula
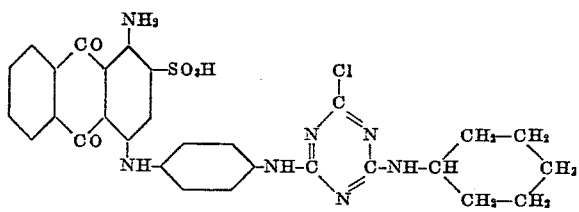
8. The anthraquinone dyestuff of the formula
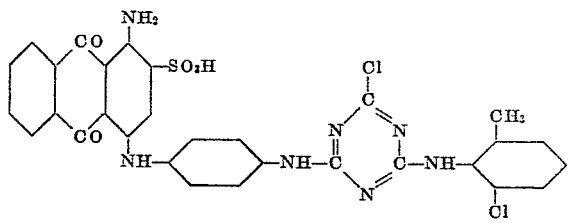
9. The anthraquinone dyestuff of the formula
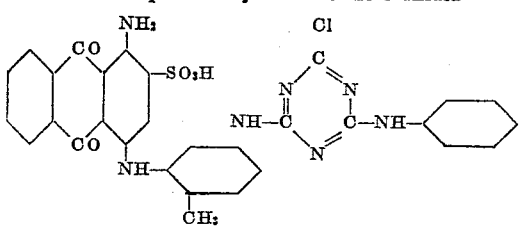
References Cited in the file of this patent
UNITED STATES PATENTS
2,235,480     Graenacher _____ Mar. 11, 1941
FOREIGN PATENTS
97,360     Switzerland _____ 1923